United States Patent
Kersting

(10) Patent No.: US 12,008,055 B2
(45) Date of Patent: *Jun. 11, 2024

(54) PLATFORM APPARATUS FOR PROVIDING QUALITATIVE COLLECTIVE KNOWLEDGE

(71) Applicant: Patrick Faulwetter, Marina Del Rey, CA (US)

(72) Inventor: Björn Kersting, Braunfels (DE)

( * ) Notice: Subject to any disclaimer, the term of this patent is extended or adjusted under 35 U.S.C. 154(b) by 490 days.

This patent is subject to a terminal disclaimer.

(21) Appl. No.: 15/100,431

(22) PCT Filed: Jun. 25, 2014

(86) PCT No.: PCT/DE2014/100210
§ 371 (c)(1),
(2) Date: Sep. 6, 2016

(87) PCT Pub. No.: WO2015/078435
PCT Pub. Date: Jun. 4, 2015

(65) Prior Publication Data
US 2016/0378872 A1    Dec. 29, 2016

(30) Foreign Application Priority Data
Nov. 28, 2013 (WO) ................ PCT/DE2013/100400

(51) Int. Cl.
*G06F 16/9535* (2019.01)
*G06F 16/27* (2019.01)
(Continued)

(52) U.S. Cl.
CPC ........ *G06F 16/9535* (2019.01); *G06F 16/278* (2019.01); *G06F 16/953* (2019.01);
(Continued)

(58) Field of Classification Search
CPC .. G06F 16/9535; G06F 16/958; G06F 16/953; G06Q 10/103; G06Q 30/0239;
(Continued)

(56) References Cited

U.S. PATENT DOCUMENTS 6,260,064 B1   7/2001   Kurzrok
7,031,952 B1   4/2006   Heumann
(Continued)

FOREIGN PATENT DOCUMENTS

FR   2981766 A1   4/2013
JP   5691229 B2   4/2015
(Continued)

OTHER PUBLICATIONS

BSCW 4.4, Nov. 2008, http:www.orbiteam.de, all pages (Year: 2008).*

(Continued)

*Primary Examiner* — Mark D Featherstone
*Assistant Examiner* — Lahcen Ennaji
(74) *Attorney, Agent, or Firm* — Bachman & LaPointe, P.C.

(57) ABSTRACT

In the case of a platform device (100) located at a web-site and capable of forming a network with a plurality of ID-detectable users or participants for gathering and processing items of information stored in a plurality of in each case code-identifiable and in each case topic-assigned storage spaces (110) of a platform (100) by the users or participants, a situation in which consensus-gaining evaluability and modifiability of the stored items of information with the formation of collective knowledge is achieved by the users or participants in that the storage spaces (110) present on the platform (100) and containing a plurality of various topics are in each case formed by a dual unit DuU, a dual unit DuU comprising in each case a first storage space (111) assigned to a predefinable topic and provided with initial items of information formulated by an initial participant but not editable by any other individual user or participant and a second storage space (112) assigned to the first storage space (111), which second storage space is editable (Continued)

by any one individual user or participant being construed by the plurality of users or participants for insertion of supplementary information relating to the initial item of information stored in the first storage space (111).

13 Claims, 4 Drawing Sheets

(51) Int. Cl.
| | | |
|---|---|---|
| G06F 16/953 | (2019.01) | |
| G06F 16/958 | (2019.01) | |
| G06Q 10/10 | (2023.01) | |
| G06Q 30/0207 | (2023.01) | |
| G06Q 30/0282 | (2023.01) | |
| G06Q 30/0601 | (2023.01) | |
| H04L 67/10 | (2022.01) | |

(52) U.S. Cl.
CPC ......... *G06F 16/958* (2019.01); *G06Q 10/103* (2013.01); *G06Q 30/0239* (2013.01); *G06Q 30/0282* (2013.01); *G06Q 30/0621* (2013.01); *H04L 67/10* (2013.01)

(58) Field of Classification Search
CPC . G06Q 30/0282; G06Q 30/0621; H04L 67/10
See application file for complete search history.

(56) References Cited

U.S. PATENT DOCUMENTS

| | | | |
|---|---|---|---|
| 7,447,807 B1 | 11/2008 | Merry | |
| 7,962,482 B2 | 6/2011 | Handman et al. | |
| 8,127,095 B1 | 2/2012 | Colgrove | |
| 8,612,449 B1 | 12/2013 | Cuthbert | |
| 8,645,295 B1 * | 2/2014 | Dillard | G06Q 30/02 705/7.29 |
| 9,613,321 B2 | 4/2017 | Molyneux | |
| 9,984,079 B1 | 5/2018 | Stickle | |
| 10,664,542 B2 | 5/2020 | Kersting | |
| 10,861,043 B1 | 12/2020 | Baker | |
| 2002/0049738 A1 | 4/2002 | Epstein | |
| 2002/0199186 A1 | 12/2002 | Ali | |
| 2003/0093423 A1 | 5/2003 | Larason | |
| 2004/0266743 A1 | 12/2004 | McMahon | |
| 2005/0097188 A1 | 5/2005 | Fish | |
| 2005/0223002 A1 * | 10/2005 | Agarwal | G06Q 30/02 |
| 2006/0064411 A1 | 3/2006 | Gross et al. | |
| 2006/0247944 A1 | 11/2006 | Calusinski | |
| 2006/0282304 A1 | 12/2006 | Bedard | |
| 2007/0061211 A1 | 3/2007 | Ramer | |
| 2008/0114629 A1 | 5/2008 | Pavlov | |
| 2008/0201418 A1 | 8/2008 | Krishnan | |
| 2009/0259526 A1 * | 10/2009 | Bechtel | G06Q 10/10 705/7.32 |
| 2010/0023382 A1 | 1/2010 | Fushimi | |
| 2010/0049683 A1 * | 2/2010 | Carter | G06Q 10/10 706/46 |
| 2010/0115215 A1 | 5/2010 | Rosychuk | |
| 2010/0205006 A1 | 8/2010 | Bergh | |
| 2010/0205543 A1 | 8/2010 | Von Werther | |
| 2010/0306223 A1 * | 12/2010 | Lee | G06F 16/24578 707/759 |
| 2011/0016179 A1 | 1/2011 | Bechtel | |
| 2011/0055017 A1 | 3/2011 | Solomon | |
| 2011/0106757 A1 | 5/2011 | Pickney | |
| 2011/0178981 A1 | 7/2011 | Bowen | |
| 2011/0231350 A1 | 9/2011 | Momma | |
| 2012/0110429 A1 | 5/2012 | Tzonis | |
| 2013/0144802 A1 | 6/2013 | Bank et al. | |
| 2013/0159289 A1 | 6/2013 | Matthews | |
| 2013/0246643 A1 | 9/2013 | Luby | |
| 2013/0247195 A1 | 9/2013 | Takahashi et al. | |
| 2013/0339301 A1 | 12/2013 | Saito | |
| 2014/0181210 A1 | 6/2014 | Kersting | |
| 2014/0310285 A1 | 10/2014 | Chan | |
| 2014/0330831 A1 | 11/2014 | Kersting | |
| 2014/0365457 A1 | 12/2014 | Kersting et al. | |
| 2014/0372432 A1 | 12/2014 | Kersting | |
| 2015/0347480 A1 | 12/2015 | Smart | |
| 2017/0017885 A1 | 1/2017 | Kersting | |

FOREIGN PATENT DOCUMENTS

| | | |
|---|---|---|
| WO | 2013/029602 A1 | 3/2013 |
| WO | 2013/029605 A1 | 3/2013 |

OTHER PUBLICATIONS

Basic Support for Cooperative Work, Version 4.4, Oct. 2007, OrbiTeam Software GmbH & Co. KG, Bonn, Germany.
International Search Report for PCT/DE2014/100216, dated Nov. 13, 2014.
International Search Report for PCT/DE2014/100210, dated Nov. 5, 2014.
International Search Report for PCT/DE2014/100211, dated Nov. 13, 2014.
International Search Report for PCT/DE2014/100213, dated Nov. 13, 2014.
International Search Report for PCT/DE2014/100214, dated Nov. 18, 2014.
International Search Report for PCT/DE2014/100215, dated Nov. 13, 2014.
BSCW 4.4 Manual, Nov. 2008, OrbiTeam Software GmbH & Co. KG, Bonn, Germany.
U.S. Office Action dated Jun. 26, 2019 for U.S. Appl. No. 15/100,455.
U.S. Office Action dated Nov. 19, 2019 for U.S. Appl. No. 15/100,434.
U.S. Office Action dated Jun. 6, 2019 for U.S. Appl. No. 15/100,434.
U.S. Office Action dated Oct. 9, 2019 for U.S. Appl. No. 15/100,443.
U.S. Office Action dated Apr. 1, 2019 for U.S. Appl. No. 15/100,443.
U.S. Office Action dated Sep. 7, 2018 for U.S. Appl. No. 15/100,443.
U.S. Office Action dated Nov. 26, 2018 for U.S. Appl. No. 15/100,440.
Antunes Pedro, "Reviewing the Quality of Awareness Support in Collaborative Applications", Journal of Systems and Software, 2014 (available online Nov. 15, 2013), pp. 146-169, Elsevier, Amsterdam, Netherlands.
BSCW 4.5 Manual, 2011, OrbiTeam Software GmbH & Co. KG, Bonn, Germany.
U.S. Office Action dated Aug. 18, 2020 for U.S. Appl. No. 15/100,443.
U.S. Office Action dated Dec. 22, 2021 for U.S. Appl. No. 15/100,443.

* cited by examiner

PLATFORM APPARATUS FOR PROVIDING QUALITATIVE COLLECTIVE KNOWLEDGE

BACKGROUND

The present invention relates to a platform device located at a web-site and capable of forming a network with a plurality of ID-detectable users or participants for gathering and processing items of information which are stored in a plurality of in each case code-identifiable and in each case topic-assigned storage spaces of a platform by the users or participants.

Platform devices of the type mentioned above are known in the prior art for a number of applications.

They are operated, inter alia, in the world-wide internet.

The prior platform devices suffer, however, from the drawback that a specific selection of predefinable links and at the same time links according to predefinable criteria are not realizable.

This may be regarded as being due, inter alia, to the fact that the current platforms store items of information, without these items of information being attributed to strictly predefinable processing criteria and to strictly predefinable evaluation criteria.

SUMMARY

Thus it is an object of the present invention to provide a platform device, by means of which collective intelligence is utilized in that items of information stored in a first storage space can be evaluated by the network participants according to strictly predefinable processing criteria and, on ascertainment of an agreement on the part of the network participants, can be supplemented or amended.

With regard to a platform device of the type mentioned above, this object is achieved in that the storage spaces provided on the platform and relating to a number of topics are in each case formed by a dual unit DuU, which dual unit DuU comprises in each case a first storage space assigned to a predefinable topic and provided with initial items of information formulated by an initial participant but not editable by any other individual user or participant, and a second storage space assigned to the first storage space and editable by any one individual user or participant is construed for insertion, by the plurality of users or participants, of supplementary information relating to the initial item of information stored in the first storage space.

Preferred embodiments of the invention are subject matter of the subclaims.

In the case of the platform device of the invention and as a result of the combination of features to the effect that the storage spaces provided on the platform and relating to a number of topics are in each case formed by a dual unit DuU, wherein a dual unit DuU comprises in each case a first storage space assigned to a predefinable topic and provided with initial items of information formulated by an initial participant but not editable by any other individual user or participant, and a second storage space, which is assigned to the first storage space and editable by any one individual user or participant, and which is construed for insertion, by the plurality of users or participants, of supplementary information relating to the initial item of information stored in the first storage space, thereby achieving a situation such that the items of information are evaluatable, processable, amendable, and then capable of being stored as a result of the formation of dual units, wherein items of information of any type are suitable for evaluation and processing, and wherein the respective items of information are allocated to a large number of different topics for the purpose of retrievability.

The purpose of a processing operation capable of being carried out by the plurality of users or participants is primarily to make an initial item of information, imported by an initial author to a first storage space of a dual unit, available to, and processable by, the users or participants so as to provide the initial item of information with a reliability rating or alternatively, a reliability evaluation, which is placed in the first storage space by the users or participants on conclusion of a processing operation carried out according to the invention, and represents a clearly defined collective evaluation for all interested persons.

According to a first preferred embodiment of the device of the invention, provision is made such that in the editable second storage space supplementary information in the form of qualitative evaluations, ascertained by at least one calculating device, of the items of information stored in the first storage space, can be imported by the users or participants and can in each case be stored in an associated storage space, wherein the at least one calculating device is construed so as to produce an item of collective evaluative information as a result of the imported individual qualitative evaluations.

Preferably, the at least one calculating device is construed so as to make it possible to carry out a qualitative evaluation by inputting individually assignable point scores of a point score scale having a predefined number of point scores, as made possible for each user or participant in the second storage space, wherein the assigned point scores can be stored in appropriate point score storage means in the case of each inputted point score.

The point score scale can, for example, be construed so as to make it possible for any one of the users or participants to assign point scores ranging from zero to 100.

According to an important preferred embodiment of the device of the invention, the first calculating device is provided so as to make it possible to carry out a calculation of the mean with reference to the cumulative point scores imported to the second storage space and assigned in each case by n different users or participants and to store the relevant number in the second storage space, wherein a mean point score value is calculated by adding together all point scores ranging from zero to a maximum number of point scores that n users or participants have awarded during the course of each evaluation, and dividing the sum by the number of n users or participants that have in each case submitted an evaluation.

According to another important preferred embodiment of the device of the invention, a second calculating device is provided that carries out a variance calculation relating to the cumulative point scores, imported to the second storage space and in each case assigned by various users or participants, and stores the relevant number in the second storage space, the variance being defined as the mean deviation of point scores from the mean point score value as ascertained by the first calculating device.

In addition, a first copying device is preferably provided that successively interprets the qualitative evaluations stored in the second storage space at predefinable time intervals as being useful items of information and transfers the same to the first storage space while overwriting the relevant previous items of information in the first storage space.

In this way, an item of collective evaluative information is created with regard to an item of content information.

Likewise, there is preferably provided a timing device that transmits reset signals to the first and second calculating devices and also to the first copying device at predefinable constant time intervals so as to set the associated devices to zero on conclusion of a respective presettable time interval, and to repeat the currently assigned function in a respective subsequent period of time of equal length.

According to an embodiment of the present invention that is similar to, but conceptionally slightly different from, the above embodiments of the device of the invention, the editable second storage space is subdivided into a contents storage space, to which information supplementary to the items of information stored in the first storage space can be imported in the form of supplementary information relating to the items of information stored in the first storage space, and an evaluation storage space, to which qualitative evaluations of the supplementary information stored in the second storage space can be imported by the users or participants, wherein at least one further calculating device is provided so as to produce an item of collective evaluative information as a result of the imported qualitative evaluations.

The at least one further calculating device is preferably construed so as to make it possible to carry out a qualitative collective evaluation by inputting individually assignable point scores of a point score scale having a predefined number of point scores, as made possible for each user or participant in the second storage space, wherein the assigned point scores can be stored in appropriate point score storage means, in the case of each inputted point score.

The point score scale can here again be dimensioned so as to make it possible for any one of the users or participants to assign point scores ranging from zero to 100.

According to an important preferred embodiment of this device of the invention, a third calculating device is therefore provided that carries out a calculation of the mean with reference to the cumulative point scores imported to the second storage space and assigned in each case by n different users or participants and stores the relevant number in the second storage space, a mean point score value being calculated by adding together all point scores ranging from zero to a maximum number of point scores that n users or participants have awarded during the course of each evaluation of an item of complementary information, and dividing the sum by the number of n users or participants that have respectively submitted an evaluation of an item of complementary information.

Likewise, according to an important and preferred embodiment of the device of the invention, a fourth calculating device is also provided that carries out a variance calculation with reference to the cumulative point scores imported to the second storage space and in each case assigned by various users or participants and stores the relevant number in the second storage space, the variance being defined as the mean deviation of point scores from the mean point score value of the evaluation of an item of complementary information as ascertained by the third calculating device.

Preferably, a second copying device is provided that on conclusion of predefinable time intervals, successively interprets the qualitative evaluations of an item of complementary information stored in the second storage space as being a useful or non-useful item of information according to predetermined stipulations relating to averages and variance in a first decision-making device and, on identifying a useful item of information, transfers the item of complementary information to the first storage space.

In this way, an item of evaluative information is created with reference to an item of complementary information.

Here again, a timing device can preferably be provided, which transmits reset signals to the third and fourth calculating devices and also to the second copying device at predefinable constant time intervals so as to set the associated devices to zero on conclusion of a respective presettable time interval and to repeat the currently assigned function in a respective subsequent period of time of equal length.

According to another embodiment of the device of the invention that is similar to, but conceptionally slightly different from, the aforementioned embodiments, the editable second storage space is subdivided into a contents storage space, to which information supplementary to the items of information stored in the first storage space can be imported in the form of supplementary information relating to the items of information stored in the first storage space, and an evaluative storage space, to which qualitative evaluations of the supplementary information stored in the second storage space can be imported by the users or participants, at least one calculating device being provided so as to produce an item of collective evaluative information as a result of the imported qualitative evaluations.

The at least one further calculating device is preferably construed so as to make it possible to carry out a qualitative collective evaluation by inputting individually assignable point scores of a point score scale having a predefined number of point scores, as made possible for each user or participant in the second storage space, wherein the assigned point scores can be stored in appropriate point score storage means in the case of each inputted point score.

The point score scale likewise preferably entails awarding of point scores ranging from 0 to 100 by any one of the users or participants.

According to an important preferred embodiment of this device of the invention, a fifth calculating device is provided that carries out a calculation of the mean with reference to the cumulative point scores, imported to the second storage space and assigned in each case by n different users or participants, and stores the relevant number in the second storage space, a mean point score value being calculated by adding together all point scores ranging from zero to a maximum number of point scores that n users or participants have awarded during the course of each evaluation of a corrective item of information, and dividing the sum by the number of n users or participants that have respectively submitted an evaluation of a corrective item of information.

Likewise according to an important and preferred embodiment of the device of the invention, a sixth calculating device is provided, which carries out a variance calculation with reference to the cumulative point scores, imported to the second storage space and in each case assigned by various users or participants, and stores the relevant number in the second storage space, the variance being defined as the mean deviation of point scores from the mean point score value of the evaluation of a corrective item of information as ascertained by the fifth calculating device.

Preferably, a third copying device is provided, which, on conclusion of predefinable time intervals, successively interprets the qualitative evaluations of a corrective item of information stored in the second storage space as being a useful or non-useful item of information, depending on predetermined stipulations relating to averages and variance, in a first decision-making device, and, on identifying a useful item of information, transfers the corrective item of information to the first storage space while overwriting the relevant previous items of information in the first storage space.

In this way, an item of evaluative information relating to a corrective item of information is created.

Here again, a timing device can preferably be provided that transmits reset signals to the fifth and sixth calculating devices and also to the third copying device at predefinable constant time intervals so as to set the associated devices to zero on conclusion of a respective presettable time interval and to repeat the currently assigned function in a respective subsequent period of time of equal length.

Preferably, any one of the participants is entitled to carry out an initial placement of a dual unit.

BRIEF DESCRIPTION OF THE DRAWINGS

The platform device of the invention is described below with reference to a preferred embodiment as illustrated in the Figures of the accompanying drawings, in which.

DETAILED DESCRIPTION

The platform device 100 of the invention located at a web-site is capable of forming a network with a plurality of ID-detectable users or participants and is construed for gathering and processing items of information stored in a plurality of in each case code-identifiable and in each case topic-assigned storage spaces 110 of a platform, by the users or participants.

The storage spaces 110, subdivided into a large number of different topics, are formed in each case on the platform by a dual unit DuU, which dual unit DuU comprises in each case a first storage space 111, assigned to a predefinable topic and provided with initial items of information formulated by an initial participant but not editable by any other individual user or participant, and a second storage space 112, which is assigned to the first storage space 111 and which is editable by any one individual user or participant, being construed for insertion, by the plurality of users or participants, of supplementary information relating to the initial item of information stored in the first storage space 111.

Figure 1:
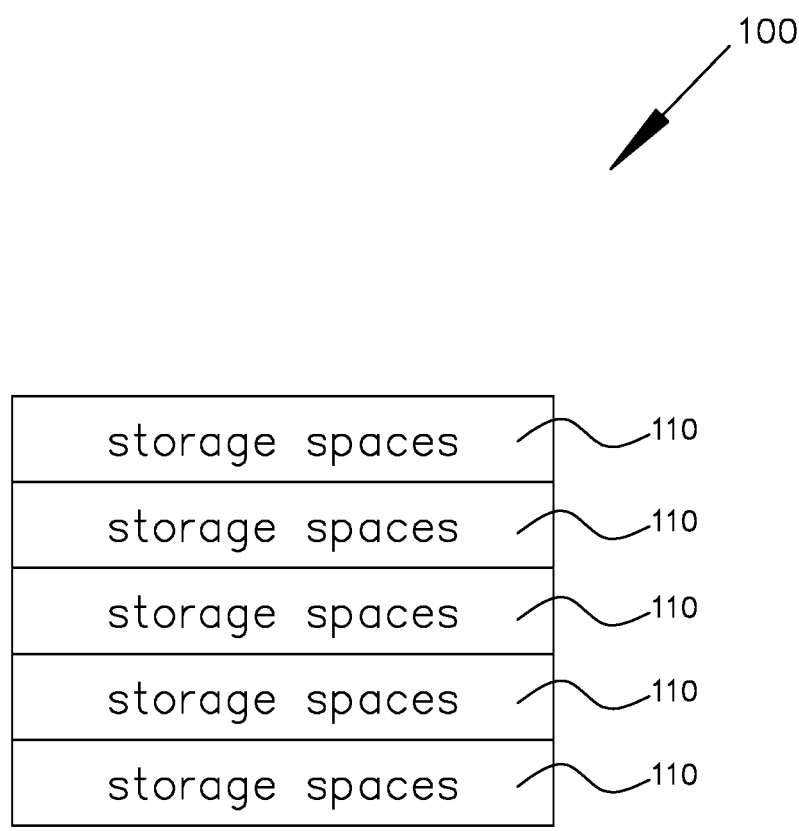
FIG. 1 shows storage spaces 110, subdivided into a plurality of various topics, of the platform device 100 of the invention in the form of a block diagram.
Figure 2:
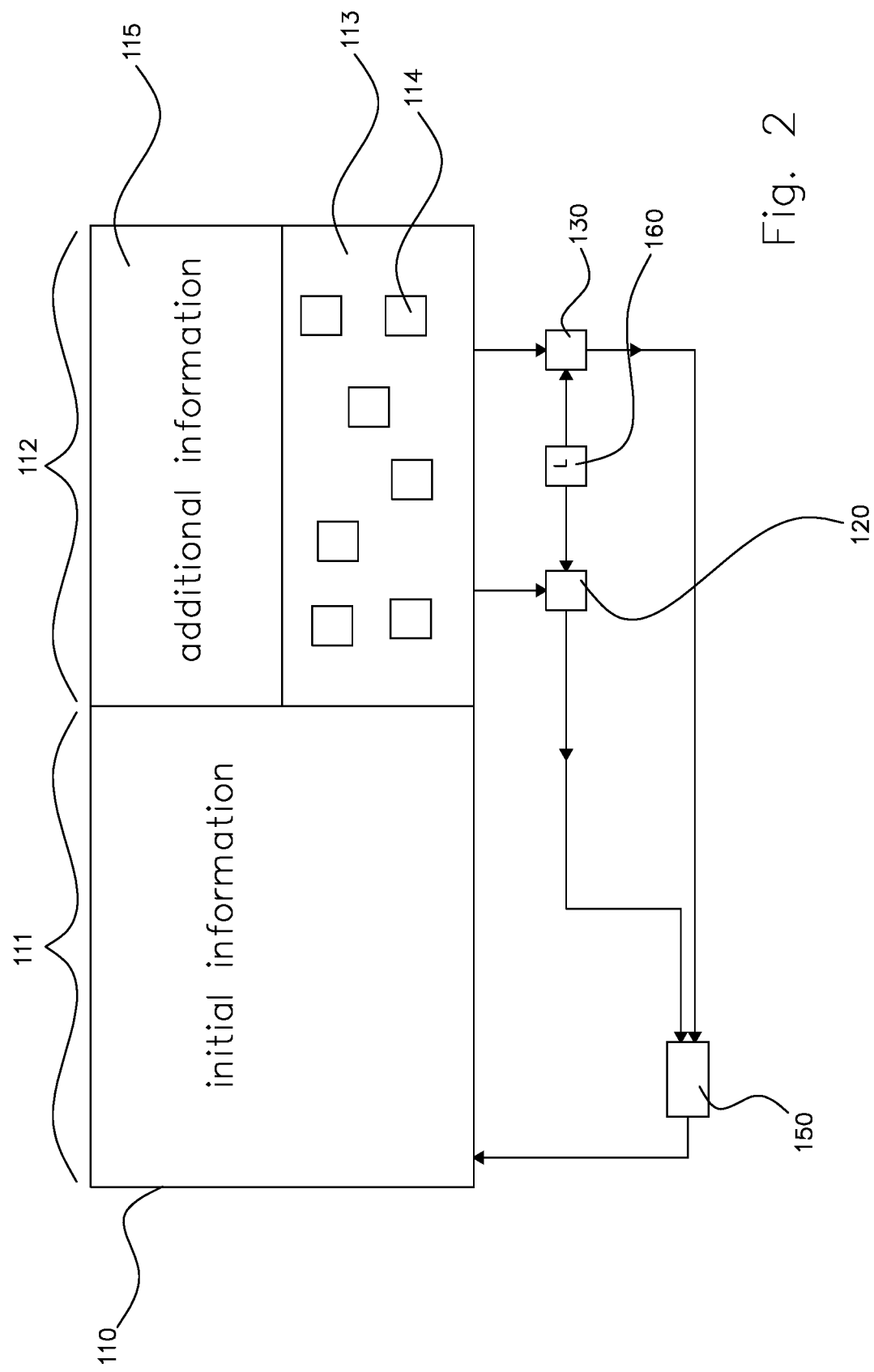
FIG. 2 shows a general layout of a dual unit DuU corresponding to a first preferred embodiment of the platform device of the invention, in the form of a block diagram.

According to the embodiment of the platform device 100 of the invention shown in FIG. 2, in the editable second storage space 112, items of supplementary information in the form of qualitative evaluations of the items of information stored in the first storage space 111 and ascertained by means of at least one calculating device 120, can be imported and stored by the users or participants, the at least one calculating device 120 being construed so as to produce an item of collective evaluative information as a result of the imported individual qualitative evaluations.

In this case, a first calculating device 120 is provided so as to make it possible to carry out a qualitative evaluation by inputting individually assignable point scores of a point score scale having a predefined number of point scores, as made possible for each user or participant in the second storage space 112, wherein the assigned point scores can be stored in appropriate point score storage means 114 in the case of each inputted point score.

The point score scale makes it possible to award point scores ranging from 0 to 100 by any one of the users or participants.

A first calculating device is provided, which carries out a calculation of the mean with reference to the cumulative point scores imported to the second storage space 112 and assigned in each case by n different users or participants, and stores the relevant number in the second storage space 112, a mean point score value being calculated by adding together all point scores ranging from zero to 100 that n users or participants have awarded during the course of each evaluation, and dividing the sum by the number of n users or participants that have in each case submitted an evaluation.

A second calculating device 130 is provided, which carries out a variance calculation with relation to the cumulative point scores imported to the second storage space 112 and in each case assigned by various users or participants and stores the relevant number in the second storage space 112, the variance being defined as the mean deviation of point scores from the mean point score value ascertained by the first calculating device 120.

In addition, a first copying device 150 is provided, which successively interprets the qualitative evaluations stored in the second storage space 112 at predefinable time intervals as being useful items of information and transfers the same to the first storage space 111 while overwriting the relevant previous items of information in the first storage space 111.

In this way, an item of evaluative information referring to an item of content information is created.

A timing device 160 is provided, which transmits reset signals to the first calculating device 120 and to the second calculating devices 130 and also to the first copying device 150 at predefinable constant time intervals so as to set the associated devices to zero on conclusion of a respective presettable time interval and to repeat the currently assigned function in a respective subsequent period of time of equal length.

According to the embodiment of the device of the invention 100 shown in FIG. 2, the editable second storage space 112 is subdivided into a contents storage space 115, to which information supplementary to the items of information stored in the first storage space 111 can be imported in the form of supplementary information relating to the items of information stored in the first storage space 111, and an evaluation storage space 113, to which qualitative evaluations of the supplementary information stored in the second storage space 112 can be imported by the users or participants, at least one calculating device 120 being provided so as to produce an item of collective evaluative information as a result of the imported qualitative evaluations.

A further calculating device 130 is construed so as to make it possible to carry out a qualitative collective evaluation by inputting individually assignable point scores of a point score scale having a predefined number of point scores, as made possible for each user or participant in the second storage space 112, wherein the assigned point scores can be stored in appropriate point score storage means 114 in the case of each inputted point score.

The point score scale is in turn dimensioned so as to make it possible for any one of the users or participants to assign point scores ranging from zero to 100.

A third calculating device 170 is provided so as to make it possible to carry out a calculation of the mean with reference to the cumulative point scores, imported to the second storage space 112 and assigned in each case by n different users or participants, and to store the relevant number in the second storage space 112, a mean point score value being calculated by adding together all point scores ranging from zero to 100 that n users or participants have awarded during the course of each evaluation of an item of complementary information, and dividing the sum by the number of n users or participants that have respectively submitted an evaluation of an item of complementary information.

In addition, a fourth calculating device 180 is provided, which carries out a variance calculation with reference to the cumulative point scores imported to the second storage space 112 and in each case assigned by various users or participants, and stores the relevant number in the second storage space 112, the variance being defined as the mean deviation of point scores from the mean point score value of the evaluation of an item of complementary information ascertained by the third calculating device 170.

There is likewise provided a second copying device 190 which, on conclusion of predefinable time intervals, successively interprets the qualitative evaluations of an item of complementary information stored in the second storage space 112 as being useful or non-useful items of information according to predetermined stipulations relating to averages and variance in a first decision-making device 200 and, on identifying a useful item of information, transfers the item of complementary information to the first storage space 111.

In this way, an item of evaluative information relating to an item of complementary information is created.

A timing device 160 is provided, which transmits reset signals to the third calculating device 170 and to the fourth calculating device 180 and also to the second copying device 190 at predefinable constant time intervals, so as to set the associated devices to zero on conclusion of a respective presettable time interval and to repeat the currently assigned function in a respective subsequent period of time of equal length.

Figure 3:
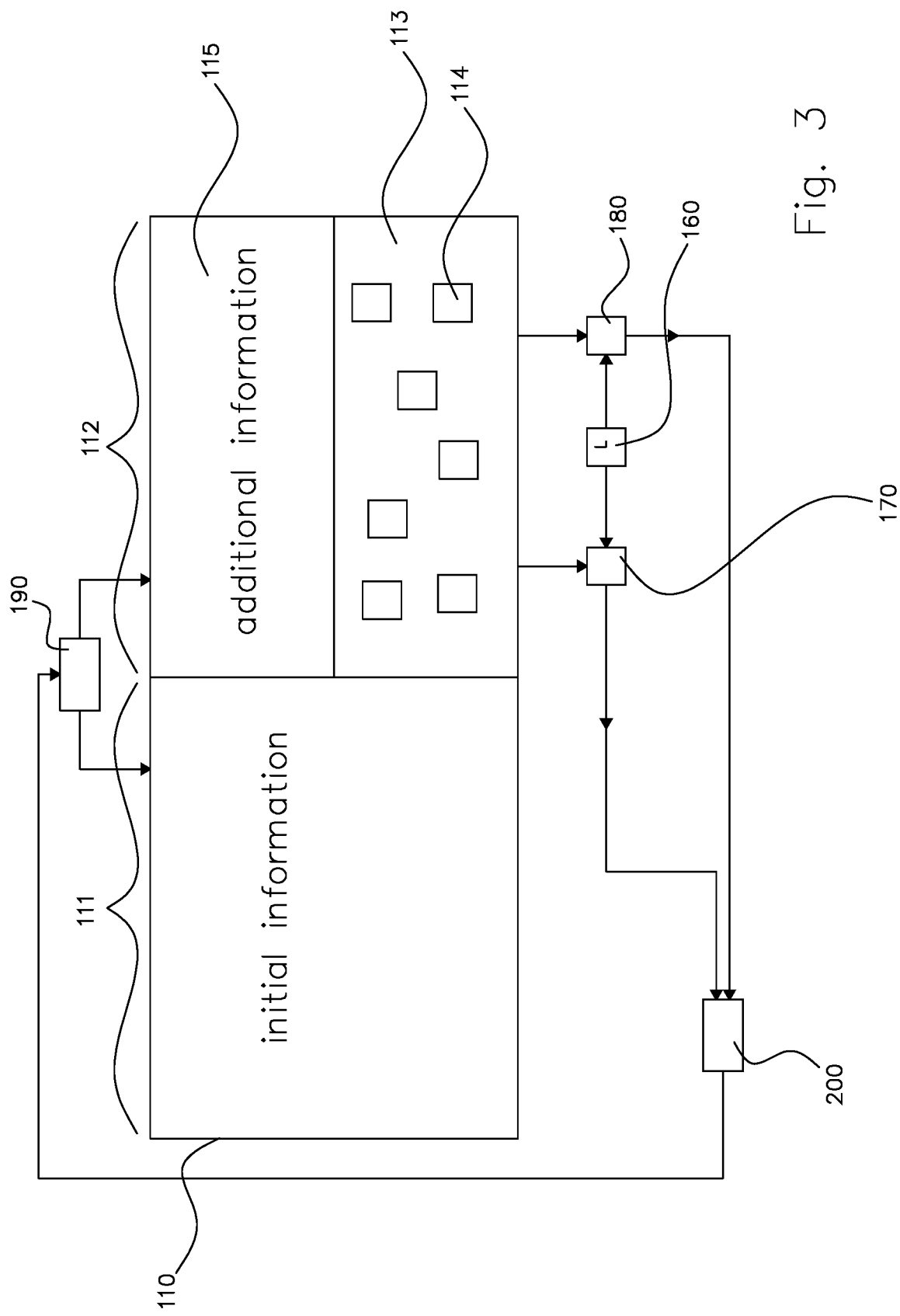
FIG. 3 shows a general layout of a dual unit DuU corresponding to a second preferred embodiment of the platform device of the invention, in the form of a block diagram.
Figure 4:
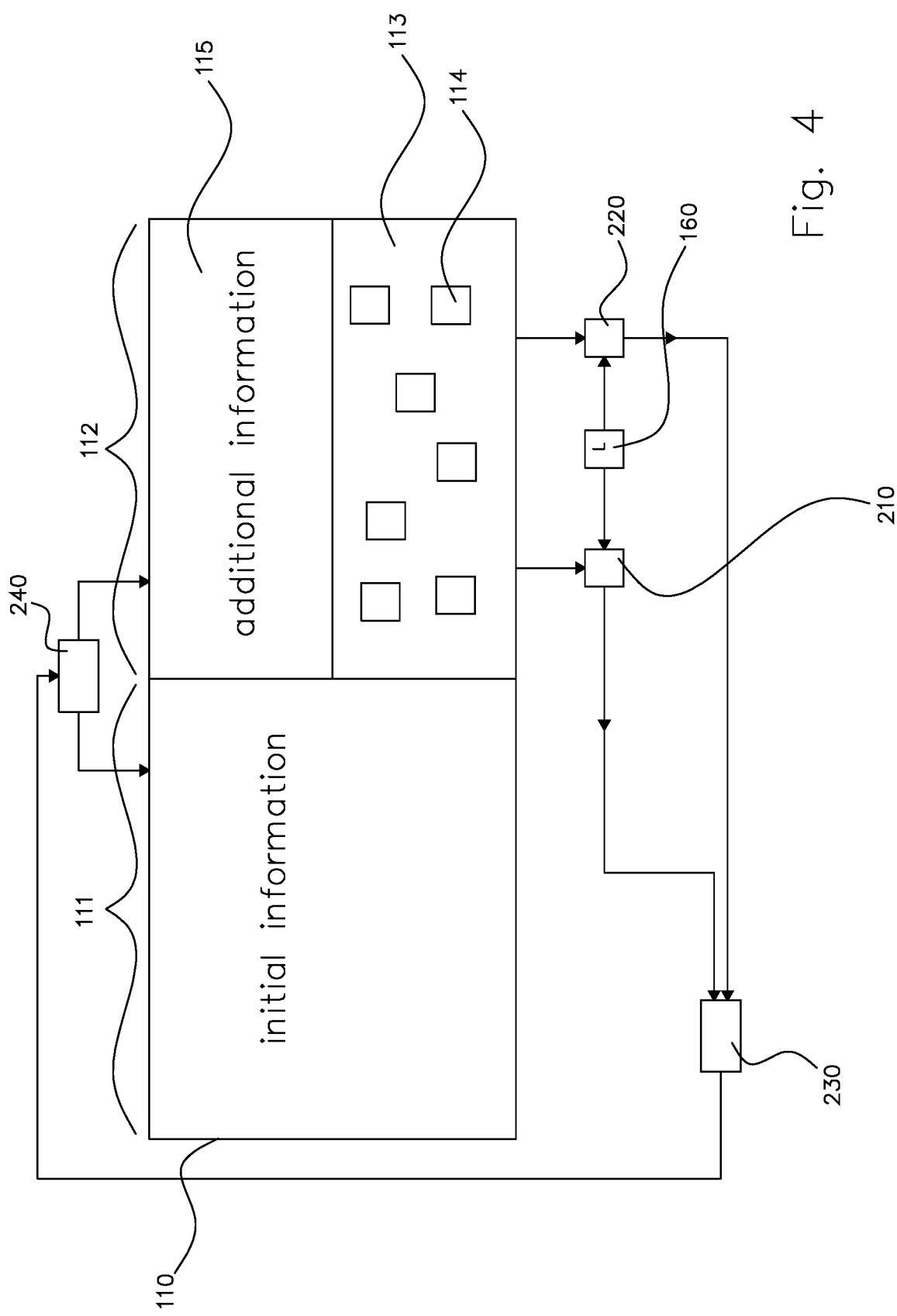
FIG. 4 shows a general layout of a dual unit DuU corresponding to a third preferred embodiment of the platform device of the invention in the form of a block diagram.

According to the embodiment of the device of the invention 100 shown in FIG. 3, the editable second storage space 112 is subdivided into a contents storage space 115 to which information supplementary to the items of information stored in the first storage space 111 can be imported in the form of supplementary information relating to the items of information stored in the first storage space 111, and an evaluation storage space 113, to which qualitative evaluations of the supplementary information stored in the second storage space 112 can be imported by the users or participants, at least one calculating device 170 being provided so as to produce an item of collective evaluative information as a result of the imported qualitative evaluations.

The at least one further calculating device 170 is construed so as to make it possible to carry out a qualitative collective evaluation by inputting individually assignable point scores of a point score scale having a predefined number of point scores, as made possible for each user or participant in the second storage space 112, wherein the assigned point scores can be stored in appropriate point score storage means 114 in the case of each inputted point score.

The point score scale is likewise dimensioned so as to guarantee that any one of the users or participants can import point scores ranging from 0 to 100 for.

To this end, a fifth calculating device 210 is provided, which carries out a calculation of the mean with reference to the cumulative point scores imported to the second storage space 112 and assigned in each case by n different users or participants, and stores the relevant number in the second storage space 112, a mean point score value being calculated by adding together all point scores ranging from zero to 100 that n users or participants have awarded during the course of each evaluation of a corrective item of information, and dividing the sum by the number of n users or participants that have respectively submitted an evaluation of a corrective item of information.

Furthermore, a sixth calculating device 220 is provided, which carries out a variance calculation with relation to the cumulative point scores imported to the second storage space 112 and in each case assigned by various users or participants, and stores the relevant number in the second storage space 112, the variance being defined as the mean deviation of point scores from the mean point score value of the evaluation of a corrective item of information as ascertained by the fifth calculating device 210.

A third copying device 240 is provided, which, on conclusion of predefinable time intervals, successively interprets the qualitative evaluations of a corrective item of information stored in the second storage space 112 as being useful or non-useful items of information depending on predetermined stipulations relating to averages and variance, in a first decision-making device 200, and, on identifying a useful item of information, transfers the corrective item of information to the first storage space 111 while overwriting the relevant previous items of information in the first storage space 111.

In this way, an item of evaluative information relating to a corrective item of information is created.

Here again, a timing device 160 is provided, which transmits reset signals to the fifth calculating device 210 and to the sixth calculating device 220 and also to the third copying device 240 at predefinable constant time intervals so as to set the associated devices to zero on conclusion of a respective presettable time interval and to repeat the currently assigned function in a respective subsequent period of time of equal length.

The embodiment of the invention explained above merely serves to provide a better understanding of the teaching of the invention defined by the accompanying claims, which is not restricted, as such, to the present embodiment.

The invention claimed is:

1. A method for hosting a web-site with user evaluation, the web-site having a platform device (100) to form a network with a plurality of users or participants for gathering and processing items of user evaluation information stored in a plurality of code-identified and topic-assigned storage spaces (110) of the platform device by the users or participants, wherein:

the storage spaces (110) allocated to a plurality of topics on the platform are each formed by a dual unit DuU, the dual unit DuU comprising:
a first storage space (111), assigned to a predefined topic and provided with initial items of information formulated by an initial participant but not edited by any other individual user or participant; and
a second storage space (112), which is assigned to the first storage space (111) and being configured for insertion, by the plurality of users or participants, of supplementary information relating to the initial item of information stored in the first storage space (111), wherein the second storage space (112) is subdivided into an evaluation storage space (113) and a contents storage space (115), the evaluation storage space including a point score storage space (114), the method comprising:

entering by the users or participants in the point score storage space (114) supplementary user evaluation information in the form of qualitative evaluations as point scores ranging from zero to one hundred as assigned by said any one of the users or participants to the predefined topic, ascertained by at least one calculating device (120, 130, 170, 180, 210, 220), of the items of information stored in the first storage space (111), the at least one calculating device (120, 130, 170, 180, 210, 220) being configured so as to produce an item of collective evaluative information as a result of the entered individual qualitative evaluations; and carrying out a qualitative evaluation by the at least one calculating device (120, 130, 170, 180, 210, 220) by:

the at least one calculating device calculating a mean of said point scores entered to the point score storage space (114) and assigned by n different users or participants, and storing the calculated mean point score value in the point score storage space (114) the mean point score value being calculated by adding together all point scores ranging from zero to a maximum number of point scores that n users or participants have awarded during the course of each evaluation, and dividing the sum by the number of n users or participants that have submitted an evaluation;

the at least one calculating device (180) calculating a variance of the point scores entered to the point score storage space (114) and assigned by various users or participants, and storing the calculated variance in the point score storage space (114), the variance being defined as the mean deviation of point scores from the mean point score value ascertained by the first calculating device (120);

a first copying device (150), at predefined constant time intervals successively interpreting the qualitative evaluations stored in the point score storage space (114) as being useful items of information, and transferring the same to the first storage space (111) while overwriting a relevant previous items of information in the first storage space (111); and with a timing device, transmitting reset signals to the at least one calculating device and also to the first copying device (150) at said predefined constant time intervals so as to set the at least one calculating device and the first copying device (150) to zero on conclusion of a respective preset time interval, and to repeat the respective currently assigned function of the at least one calculating device and the first copying device (150) in a respective subsequent period of time of equal length.

2. The method as claimed in claim 1, the method further comprising:

entering in the contents storage space information supplementary to the items of information stored in the first storage space (111) in the form of supplementary information relating to the items of information stored in the first storage space (111).

3. The method as claimed in claim 2, further comprising:

via the at least one calculating device importing a qualitative collective evaluation by inputting individually assignable point scores of a point score scale having a predefined number of point scores, as made possible for each user or participant in the point score storage space (114), storing the assigned point scores in the point score storage space (114) in the case of each inputted point score.

4. The method as claimed in claim 3, wherein the point score scale enables any one of the users or participants to assign point scores ranging from zero to one hundred.

5. The method as claimed in claim 4, further comprising:

via the at least one calculating device calculating a mean of the point scores entered to the point score storage space (114) and assigned by n different users or participants, and storing stores the calculated mean in the point score storage space (114), the mean point score value being calculated by adding together all point scores ranging from zero to a maximum number of point scores that users or participants have awarded during the course of each evaluation of an item of complementary information, and dividing a sum of the added point scores by the number users or participants that have respectively submitted an evaluation of an item of complementary information.

6. The method as claimed in claim 5, further comprising:

via the at least one calculating device calculating a variance of the point scores entered to the point score storage space (112) and assigned by various users or participants, and storing the calculated variance in the point score storage space (114), the variance being defined as the mean deviation of point scores from the mean point score value of the evaluation of an item of complementary information as ascertained by the at least one calculating device.

7. The method as claimed in claim 6, further comprising:

on conclusion of said constant time intervals, via a second copying device (190) successively interpreting the qualitative evaluations of an item of complementary information stored in the point score storage space (114) as being useful or non-useful items of information according to predetermined stipulations relating to averages and variance in a first decision-making device (200), and, on identifying a useful item of information, transferring the item of complementary information to the first storage space (111).

8. The method as claimed in claim 1, wherein the editable second storage space (112) is subdivided into a contents storage space (115), to which the information supplementary to the items of information stored in the first storage space (111) is entered in the form of a corrective item of information of the items of information stored in the first storage space (111), and an evaluation storage space (113), to which qualitative evaluations of the corrective item of information stored in the second storage space (112) is entered, the at least one calculating device producing an item of collective evaluative information as a result of the entered qualitative evaluations.

9. The method as claimed in claim 8 wherein the point score scale enables any one of the users or participants to assign point scores ranging from zero to (100).

10. The method as claimed in claim 9 further comprising:

via the at least one calculating device carrying out a calculation of a mean of the point scores entered to the point score storage space (114) and assigned by different users or participants, and stores the relevant number in the point score storage space (114), the mean point score value being calculated by adding together all point scores ranging from zero to a maximum number of point scores that users or participants have awarded during the course of each evaluation of a corrective item of information, and dividing a sum of the added point scores by the number users or participants that have respectively submitted an evaluation of a corrective item of information.

11. The method as claimed in claim 10, further comprising:
via the at least one calculating device carrying out a variance calculation with reference to the point scores entered to the point score storage space (114) and assigned by various users or participants, and stores the calculated variance in the point score storage space (112), the variance being defined as the mean deviation of point scores from the mean point score value of the evaluation of a corrective item of information ascertained by the at least one calculating device.

12. The method as claimed in claim 11, further comprising:
on conclusion said constant time intervals, via a third copying device (240) successively interpreting the qualitative evaluations of a corrective item of information stored in the point score storage space (114) as being a useful or non-useful item of information, depending on predetermined stipulations relating to averages and variance, in a first decision-making device (200) and, on identifying a useful item of information, transferring the corrective item of information to the first storage space (111) while overwriting the relevant previous items of information in the first storage space (111).

13. The method as claimed in claim 1, wherein any one of the participants is entitled to an initial insertion of a dual unit having a first storage space (111) and a point score storage space (114).

* * * * *